United States Patent
Gommans et al.

(10) Patent No.: US 7,459,515 B2
(45) Date of Patent: Dec. 2, 2008

(54) FAST-CURING MODIFIED SILOXANE COMPOSITIONS

(75) Inventors: Louie Herman Gommans, Pukekohe (NZ); Norman R. Mowrer, La Habra, CA (US); Haruji Sakugawa, Anaheim, CA (US); Michael Norman Bavin, Manurewa (NZ); Shu Yi Chu, Howick (NZ); Karen Tisha Constable, Avondale (NZ)

(73) Assignee: PPG Industries Ohio, Inc., Cleveland, OH (US)

( * ) Notice: Subject to any disclaimer, the term of this patent is extended or adjusted under 35 U.S.C. 154(b) by 393 days.

(21) Appl. No.: 10/943,241

(22) Filed: Sep. 15, 2004

(65) Prior Publication Data

US 2006/0058451 A1   Mar. 16, 2006

(51) Int. Cl.
*C08G 77/18* (2006.01)
(52) U.S. Cl. .............................. 528/26; 528/28; 528/27
(58) Field of Classification Search .................... 528/26, 528/27, 28
See application file for complete search history.

(56) References Cited

U.S. PATENT DOCUMENTS

| | | | |
|---|---|---|---|
| 4,233,428 A | 11/1980 | Endo | |
| 4,250,074 A | 2/1981 | Foscante et al. | |
| 4,252,933 A | 2/1981 | Sumida | |
| 5,889,124 A * | 3/1999 | Ando et al. | 525/403 |
| 6,281,321 B1 * | 8/2001 | Kelly et al. | 528/17 |

FOREIGN PATENT DOCUMENTS

| | | |
|---|---|---|
| WO | WO 80/00847 | 5/1980 |
| WO | WO 96/16109 | 5/1996 |
| WO | WO 97/42027 | 11/1997 |
| WO | WO 98/32792 | 7/1998 |

* cited by examiner

*Primary Examiner*—Margaret G Moore
(74) *Attorney, Agent, or Firm*—Donald R. Palladino

(57) ABSTRACT

Fast-curing modified siloxane compositions comprise; (1) an alkoxy- or silanol-functional silicone intermediate, (2) at least one amine reactive ingredient selected from the group consisting of acetoacetate-functional ingredients, acrylate-functional ingredients, and mixtures thereof, (3) an epoxy-functional ingredient, (4) a curing agent selected from the group consisting of amines, aminosilanes, ketimines, aldimines and mixtures thereof, and (5) water. Other ingredients useful in forming fast-curing modified siloxane compositions of this invention include silanes, organometallic catalysts, solvents, pigments, fillers and modifying agents. The above-identified ingredients are combined and reacted to form a fully cured protective film comprising a cross-linked enamine polysiloxane and/or acrylate polysiloxane chemical structure in a reduced amount of time when compared to conventional epoxy siloxane compositions.

22 Claims, No Drawings

FAST-CURING MODIFIED SILOXANE COMPOSITIONS

FIELD OF THE INVENTION

This invention relates to siloxane resin compositions used for forming chemical, corrosion and weather resistant protective coatings and, more particularly, to a modified siloxane composition specially formulated to provide accelerated rates of reaction and cure over a broad temperature range, including ambient temperature if desired, to minimize the time and/or energy needed from application to obtain a desired protective film coating without the loss of flexibility.

BACKGROUND OF THE INVENTION

The use of siloxane resins as a desired resin additive in forming protective coatings is well known in the art. In certain applications, the addition of a siloxane ingredient, e.g., a siloxane resin, is known to contribute properties of flexibility, impact and weather resistance to the resulting cured film coating. In one such example, a polysiloxane resin is combined with an epoxy resin to provide improved properties of impact resistance, flexibility, corrosion resistance, and weatherability to the resulting epoxy resin-based film coating.

Typically, siloxane resins used in this capacity react with a base resin material, e.g., an epoxy resin, by an acid or base catalyzed hydrolysis of the siloxane resin and an aminosilane, followed by condensation of the resulting silanol groups formed during hydrolysis and reaction of amine with epoxy. This reaction mechanism is one that is initiated by the presence of moisture conducted in the presence of an amine, and driven to completion by evaporation of alcohol formed during the hydrolysis reaction. While such known epoxy-polysiloxane coating compositions are useful in forming protective coatings providing a degree of coating hardness, flexibility, impact resistance, weatherablity, and corrosion and chemical resistance to an underlying substrate, such coating properties occur or develop only after the passage of a particular drying or curing time. The need to provide coatings having reduced volatile organic content (VOC), to meet certain regulatory requirements, has necessitated the use of lower molecular weight resins in the formulation of such coatings.

A disadvantage, however, with using such lower molecular weight resins is that the desired above-noted coating properties can only be acquired by increasing the cross-link density of these resins, which takes longer and requires a corresponding longer drying or curing time and/or increased energy input (for example relating to external heating equipment that may be use to improve the cure time) when compared to coating compositions prepared by using higher molecular weight resins. Further, the increased cross-link density can result in the coating having a reduced degree of flexibility.

In an example known epoxy-polysiloxane coating composition, the cross-link density of the combined ingredients is attained by the reaction methodology noted above; namely, by hydrolytic condensation of the siloxane ingredient and reaction of amine with epoxy resin. While these ingredients are known to provide a protective coating having desired chemical and mechanical properties, while also meeting reduced VOC requirements, the drying time for such coating may be unsuited for certain applications calling for quickened or reduced drying times.

It is, therefore, desired that modified siloxane compositions be formulated that are capable of providing a degree of coating flexibility, hardness, impact resistance, weatherablity, and corrosion and chemical resistance that is the same as or better than that of known epoxy-polysiloxane coating compositions, while at the same time providing such properties within a reduced drying or cure time and over a broad temperature range that can include ambient temperature if so desired. If formulated to provide reduced curing time and curing at ambient temperature, modified siloxane compositions of this invention provide a further advantage of avoiding the need to use external heating devices for curing. It is also desired that modified siloxane compositions of this invention be formulated to provide such desired chemical and mechanical properties within reduced drying and cure times using readily available material and without the need for special processing using exotic techniques or equipment.

SUMMARY OF THE INVENTION

Fast-curing modified siloxane compositions of this invention generally comprise: (1) an alkoxy- or silanol-functional silicone intermediate, (2) at least one amine reactive ingredient selected from the group consisting of acetoacetate-functional ingredients, acrylate-functional ingredients, and mixtures thereof, (3) an epoxy-functional ingredient, (4) a curing agent selected from the group consisting of amines, aminosilanes, ketimines, aldimines and mixtures thereof, and (5) water. Other ingredients useful in forming fast-curing modified siloxane compositions of this invention include silanes, organometallic catalysts, solvents, pigments, fillers and modifying agents.

The above-identified ingredients are combined and reacted to form a fully cured protective film comprising a fully cross-linked polysiloxane chemical structure. In the event that the selected amine reactive ingredient is an acetoacetate-functional ingredient, the resulting fully cross-linked chemical structure will comprise an enamine epoxy polysiloxane. In the event that the selected amine reactive ingredient is an acrylate-functional ingredient, the resulting fully cross-linked chemical structure will comprise an acrylate epoxy polysiloxane.

The above-identified ingredients are specially selected and are combined to provide fast-curing modified siloxane compositions specifically formulated to provide a desired fully cured protective film coating within a reduced cure or drying time when compared to conventional epoxy siloxane compositions. Specifically, fast-curing modified siloxane compositions of this invention take advantage of the relatively accelerated rate of reaction between the curing agent and the amine reactive ingredient, when compared to that of the conventional epoxy siloxane compositions relying on reaction between the amine and epoxy ingredients. Fast-curing modified siloxane compositions of this invention provide such reduced cure and drying times without compromising such desired properties as flexibility, hardness, impact resistance, weatherability, corrosion and chemical resistance.

DETAILED DESCRIPTION OF THE INVENTION

Fast-curing modified siloxane compositions of this invention are formed by combining in the presence of water: (1) an alkoxy or silanol-functional silicone intermediate with; (2) an optional silane; (3) an amine reactive ingredient selected from the group consisting of acetoacetate-functional ingredients, acrylate-functional ingredients, and mixtures thereof; (4) an epoxy-functional ingredient; (5) a curing agent; (6) an optional organometallic catalyst; and (7) optional pigments, fillers and modifying agents.

Fast-curing modified siloxane compositions of this invention can be provided in the form of a two-component system, e.g., wherein the ingredients are provided in two separate containers that are combined and mixed together prior to application, or in certain embodiments can be provided in the form of a single component in a single container. A feature of these compositions is that, because of the particular selection of chemical ingredients and/or the relative amounts of such ingredients used, they operate when combined to provide a protective film coating having desired mechanical and chemical properties that are the same as or that exceed conventional epoxy-polysiloxane coatings while doing so within a greatly reduced drying or cure time over a broad range of curing temperatures. Example embodiments of modified siloxane compositions of this invention are formulated to provide a cured film within such a reduced drying or cure time in an ambient temperature environment, i.e., without the need for external heating devices.

As used herein, the term "modified" is intended to refer to the fact that siloxane compositions prepared according to this invention include a siloxane ingredient that is combined with other resin ingredients selected from the group including acrylic, polyester, polyether, urethane, epoxy resins, and mixtures thereof to provide a copolymer or an interpenetrating polymer network (IPN) having hybrid properties of impact resistance, flexibility, weatherability, corrosion and chemical resistance that are not otherwise provided by siloxane resin compositions alone. As described in better detail below, such properties are the result of the selective choice of ingredients, the relative amounts of the ingredients, and/or the manner in which the selected ingredients are combined together.

Silicone Intermediate

With respect to the alkoxy or silanol-functional silicone intermediate, useful silicone intermediates include, but are not limited to, siloxanes or polysiloxanes having the following formula:

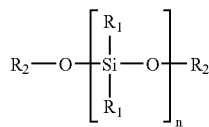

where each $R_1$ is selected from the group consisting of the hydroxy group and alkyl, aryl, and alkoxy groups having up to about six carbon atoms. Each $R_2$ is selected from the group consisting of hydrogen and alkyl and aryl groups having up to six carbon atoms. It is preferred that $R_1$ and $R_2$ comprise groups having less than six carbon atoms to facilitate rapid hydrolysis of the silicone intermediate, which reaction is driven by the volatility of the alcohol analog product of the hydrolysis. $R_1$ and $R_2$ groups having greater than six carbon atoms tend to impair the hydrolysis of the silicone intermediate due to the relatively low volatility of each alcohol analog. It is desired that "n" be selected so that the silicone intermediate have an average molecular weight in the range of from about 400 to about 10,000, and more preferably in the range of from 800 to 2,500.

Preferred silicone intermediates include alkoxy-functional polysiloxanes, such as methoxy-functional polysiloxanes and include, but are not limited to: DC-3074 and DC-3037 from Dow Corning; GE SR191, SY-550, and SY-231 from Wacker located in Adrian, Mich. Preferred silicone intermediates also include silanol-functional polysiloxanes such as, but not limited to, Dow Corning's DC-840, Z6018, Q1-2530 and 6-2230 intermediates.

Fast-curing modified siloxane compositions of this invention comprise in the range of from about 5 to 50 percent by weight (pbwt) silicone intermediate, and preferably in the range of from about 10 to 30 pbwt, based on the total weight of the composition. A particularly preferred fast-curing modified siloxane composition of this invention comprises in the range of from about 10 to 25 pbwt silicone intermediate. A particularly preferred silicone intermediate is a phenyl methyl methoxy functional siloxane (DC-3074).

Silane Ingredient

With respect to the silane ingredient, suitable silanes include those having the general formula

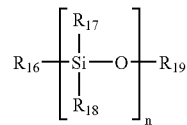

where $R_{16}$, $R_{17}$ and $R_{18}$ are independently selected from the group consisting of hydrogen and alkyl, aryl, cycloalkyl, alkoxy, aryloxy, hydroxyalkyl, alkoxyalkyl and hydroxyalkoxyalkyl groups containing up to six carbon atoms, and where $R_{19}$ is selected from the group consisting of hydrogen and alkyl and aryl groups having up to six carbon atoms. In an example embodiment, at least one of the groups include oxy constituents for polymerization, and "n" is in the range of from 1 to 5, and may have an average molecular weight in the range of from 150 to 600.

The silane ingredient is an optional ingredient that may be used in forming fast-curing modified siloxane compositions of this invention, for example where a compatablizing agent would be helpful. When used in this capacity, the silane acts as to assist in compatablizing the epoxy, acetoacetate and/or acrylate, silicone intermediate and aminosilane ingredients into the remaining resin matrix. A preferred silane is phenyl/methyl methoxy-silane that is available, for example, from Dow Corning under the product name QP8-5314. This silane is preferred because it is monomeric and has phenyl functionality to assist with compatibilzation.

Fast-curing modified siloxane compositions of this invention may comprise up to about 10 percent by weight (pbwt) silane, preferably in the range of from about 0.5 to 5 pbwt, based on the total weight of the composition. A particularly preferred fast-curing modified siloxane composition of this invention comprises in the range of from about 0.85 to 2 pbwt silane.

Amine Reactive Ingredient—Acetoacetate-Functional Ingredient

With respect to the amine reactive ingredient, it can be an acetoacetate-functional ingredient. As used herein, the term "acetoacetate-functional ingredient" is understood to mean both substituted and non-substituted acetoacetate-functional ingredients. Suitable acetoacetate-functional ingredients include those selected from the group including acetoacetate-functional diluents, acetoacetate-functional oligomers, acetoacetate-functional polymers, and mixtures thereof.

Suitable acetoacetate-functional ingredients include those having the general chemical formula

where $R_{20}$ can be selected from the group including acrylic, polyester, polyether, and urethane polymers or diluents, or any hydroxy-functional polymer that is capable of being functionalized with where "a" can be from 1 to 10, and where $R_{21}$, can he hydrogen or can be a carbon-containing group having up to about 6 carbon atoms.

The acetoacetate-functional ingredient is useful in forming fast-curing modified siloxane compositions of this invention because the speed of the amine/acetoacetate reaction is much quicker than the speed of the amine/epoxy reaction in conventional epoxy-polysiloxane resin compositions, thereby facilitating a desired reduction in drying and cure time. A reduction in coating composition set up time, i.e., a fast-cure coating, is desired in applications such as those where the coated substrate is subjected to handling, impact, weather, corrosion, or chemical exposure shortly after being coated.

Suitable acetoacetate-functional diluents and oligomers include tris acetoacetylated trimethylolpropane (TMP), diaacetoacetylated 2-butyl-2-ethyl-1,3-propanediol (BEPD), diacetoacetylated neopentyl glycol (NPG), or any hydroxy-functional diluent that is easily transacetiacetylated, e.g., transesterfied with tertiary butyl acetoacetate (TBAA) with elimination of tertiary butanol, with tributylammonium acetate.

The use of acetoacetate-functional oligomers and acetoacetate-functional diluents are desired for the same reason noted above, while doing so at a reduced viscosity when compared to acetoacetate-functional polymers. A particularly preferred acetoacetate-functional diluent and oligomer is tris acetoacetylated TMP available, for example, from King Industries of Norwalk Connecticut under the product name K-Flex such as K-Flex XM-7301.

Suitable acetoacetate-functional polymers include those having an acrylic, polyester, polyether, or urethane chemical backbone. Preferred acetoacetate-functional acrylic polymers include those available, for example, from Akzo Nobel of England under the product name Setalux such as Setalux 7202 XX 50; from Guertin Bros., of Canada under the product name CSA such as CSA 582 (85% acetoacetate-functional acrylic polymer having an equivalent weight of 600); and from Guertin Bros., under the product name GPAcryl, e.g., GPAcryl 513, GPAcryl 550, GPAcryl 597, GPAcryl 613, GPAcryl 766; and from Nuplex of Auckland, New Zealand under the product name ACR such as ACR441XD. The use of acetoacetate-functional polymers are desired for the same reason noted above. Suitable acetoacetate-functional polymers include acetoacetate-functional polyester polymers such as those available, for example, from Guertin Bros., under the product name GPEster, for example GPEster 766.

In addition to those acetoacetate-functional polymers described above, any hydroxyl-functional polymer, be it an acrylic, polyester, urethane, alkyd and the like, that can be converted into an acetoacetate-functional polymer with TBBA are acceptable for use in forming fast-curing modified siloxane compositions of this invention. Example acetoacetate-functional urethane polymers include those that such as urethane diols and urethane triols that are bonded to acetoacetate.

An acetoacetate-functional oligomer, e.g., having mono, di or tri functionality, can be used in circumstances where reduced VOC may be required or desired. The degree of acetoacetate-functionality can have an impact on both the initial cross-link density and pot life of the modified siloxane composition. Therefore, the use of oligomers may also be desired in certain applications calling for reduced cross-link density or improved pot life.

An acetoacetate-functional polymer can be used in circumstances where reduced VOC is not a concern and/or where the degree of enamine functionality in the final film is not of concern. Generally, the reaction product between the amine and acetoacetate-functional ingredient is an enamine characterized by as a general constituent the C=CN group. Using too much acetoacetate-functional polymer in forming compositions of this invention can generate a high level of enamine functionality in the final film, which enamine functionality characteristically causes yellowing of the film when exposed to ultra violet (UV) radiation.

In certain applications where such yellowing is not desired, the equivalent weights of all acetoacetate-functional polymers and acetoacetate-functional oligomers or diluents are carefully balanced for the purpose of controlling the extent of enamine formation. A blend of an acetoacetate-functional oligomer and acetoacetate-functional polymer can be used in these circumstances to achieve a desired mole ratio of enamine functionality, as well as to achieve the combined properties of a relatively reduced viscosity, a desired cross-link density, and desired mechanical properties, while still providing an improved drying time. Alternatively, as discussed below, an acrylate-functional ingredient, or a combination of acetoacetate-functional ingredient and acrylate-functional ingredient, can also be used to control the desired mole ratio of enamine formation.

In an example embodiment, up to about 40 pbwt of the acetoacetate-functional ingredient (oligomer, diluent and/or polymer), and preferably in the range of from about 5 to 30 pbwt, is used to form fast-curing modified siloxane compositions of this invention based on the total weight of the composition. A particularly preferred fast-curing modified siloxane composition of this invention comprises in the range of from about 7 to 25 pbwt acetoacetate-functional ingredient.

As discussed below, the fast-curing modified siloxane compositions of this invention can be formed using an acetoacetate-functional ingredient, can be formed using an acetoacetate-functional ingredient in addition to an acrylate-functional ingredient, or can be formed using an acrylate-functional ingredient in place of the acetoacetate-functional ingredient depending on the particular end use application and final film coating properties that are desired.

Amine Reactive Ingredient—Acrylate-Functional Ingredient

With respect to amine reactive ingredient, it can be an acrylate-functional ingredient, it is understood that this ingredient can be used in addition to or in place of the acetoacetate-functional ingredients discussed above to form fast-curing modified siloxane compositions of this invention. As used herein, the term "acrylate-functional ingredient" is understood to mean both substituted and non-substituted acrylate-functional ingredients. Suitable acrylate-functional ingredients include those selected from the group including acrylate-functional diluents, acrylate-functional oligomers, acrylate-functional polymers, and mixtures thereof.

Suitable acrylate-functional ingredients include those having the general chemical formula:

$$R_{22}[OCOCHCH]_b R_{23}$$

where $R_{22}$ can be selected from the group including acrylic, polyester, polyether, and urethane polymers or diluents, or any hydroxy-functional polymer that is capable of being functionalized with [OCOCHCH], where "b" can be from 1 to 10, and where $R_{23}$ can he hydrogen or can be a carbon-containing group having up to about 6 carbon atoms.

The acrylate-functional ingredient is useful in forming fast-curing modified siloxane compositions of this invention because the relative speed of the amine/acrylate reaction, while not as fast as that of the amine/acetoacetate reaction, is still quicker than the speed of the amine/epoxy reaction in conventional epoxy-polysiloxane resin compositions, thereby facilitating a desired reduction in drying and cure time.

Suitable acrylate-functional diluents and oligomers include trimethylolpropane triacrylate, tripropyleneglycol triacrylate, dipropylene glycol diacrylate, cyclohexanedimethanol diacrylate, hexanediol diacrylate, pentaerythritol tetraacrylate, di-trimethylolpropane triacrylate, neopentylglycol propoxylate diacrylate, ethoxylated trimethalpropane triacrylate, urethane acrylate oligomer, propoxylated glyceryl triacrylate, and aliphatic tetrafunctional polyester acrylate oligomer.

The use of acrylate-functional oligomers and diluents are desired for the same reason noted above, while doing so at a reduced viscosity when compared to acrylate-functional polymers. Preferred acrylate-functional diluents and oligomers include trimethalolpropane triacrylate available, for example, by Cognis of Exton, Pa., under product name Photomer 4006; neopentylglycol propoxylate diacrylate available, for example by Cognis under product names Photomer 4126 and 4127; ethoxylated trimethalpropane triacrylate available, for example, by Cognis under product name Photomer 4129; and propoxylated glyceryl triacrylate available, for example, by Cognis under product name Photomer 4094.

Suitable acrylate-functional polymers include those having an acrylic, polyester, polyether or urethane chemical backbone. Preferred acrylate-functional polymers include: aliphatic urethane triacrylate available, for example, from Cognis under the product name Photomer 6008; aliphatic urethane acrylate available under the product name Photomer 6893; aliphatic urethane diacrylate available under the product name Photomer 6210; urethane acrylate available, for example, from Sartomer of Exton Pa., under the product name CN968; epoxy acrylate from Sartomer under the product name CN104; epoxy novolac acrylate from Sartomer under the product name CN112; and polyester acrylate from Sartomer under the product name CN292 and from Cognis under the product name Photomer 5432. The use of acrylate-functional polymers are desired for the same reason noted above.

An acrylate-functional diluent or oligomer, e.g., having mono, di or tri functionality, can be used in circumstances where reduced VOC may be required or desired. The degree of acrylate-functionality can have an impact on both the initial cross-link density and pot life of the modified siloxane composition. Therefore, the use of oligomers may also be desired in certain applications calling for reduced cross-link density or improved pot life.

An acrylate-functional polymer can be used in circumstances where reduced VOC is not a concern and/or where the enamine functionality in the final film is not desired. Unlike using an acetoacetate-functional ingredient, that when combined with an amine does generally result in the production of an enamine or enamine, the use of an acrylate-functional ingredient does not form an enamine or enamine. Thus, use of an acrylate-functional ingredient may be desired over an acetoacetate-functional ingredient where a fastest curing is not necessary and/or when a coating that does not display yellowing of the film when exposed to ultra violet (UV) radiation is desired.

In an example embodiment, up to about 40 pbwt of the acrylate-functional ingredient (oligomer, diluent and/or polymer), and preferably in the range of from about 5 to 30 pbwt, is used to form fast-curing modified siloxane compositions of this invention based on the total weight of the composition. A particularly preferred fast-curing modified siloxane composition of this invention comprises in the range of from about 7 to 25 pbwt acrylate-functional ingredient.

Fast-curing modified siloxane compositions of this invention are prepared using one or both of the acetoacetate-functional ingredient and/or the acrylate-functional ingredient. Thus, while the relative amounts of each of these ingredients have been initially presented in a manner of up to about 40 pbwt, this is understood to account for the fact that one of the two ingredients may be used in place of the other, and that the amine reactive ingredient is understood to be a mandatory ingredient for preparing fast-curing modified siloxane compositions of this invention. In the event that a combination of the acetoacetate-functional ingredient and acrylate-functional ingredient is used, the combined amount of these ingredients will not exceed the amounts presented above for each individually.

Epoxy-Functional Ingredient

With respect to the epoxy-functional ingredient, suitable epoxy-functional ingredients useful in forming fast-curing modified siloxane compositions of this invention include those selected from the group including epoxy resins, epoxy-functional acrylic resins, epoxy-functional silanes, and combinations thereof. The epoxy-functional ingredient is used in forming fast-cure modified siloxane compositions of this invention for the purpose of increasing corrosion and chemical resistance, and in certain circumstances reducing VOC.

Suitable epoxy resins include those having more than one 1,2-epoxy group per mole, and can be saturated or unsaturated, aliphatic, cycloaliphatic, or heterocyclic. Preferably, epoxy resins useful as epoxy-functional ingredients are liquid rather than solid, have an epoxide equivalent weight of about 100 to about 2,000, and more preferably in the range of from about 100 to 500 and have a reactivity of about two. Polyepoxides which can be used in the present invention are described in U.S. Pat. No. 3,183,198 to Wagner, in column 3, line 27 through column 4, line 64. This portion of U.S. Pat. No. 3,183,198 is incorporated herein by reference. The epoxy resin used can also contain some monomer units having only one oxirane group. However, only a small portion of these can be tolerated without adversely affecting the desired properties of the final product. A blend of different monomer types can also be used.

Suitable epoxy resins include: Shell Epon 828 (bisphenol A-epichlorohydrin epoxy resin) and/ or blends of this resin with difunctional epoxide reactive diluents such as neopentylglycol diglycidylether, resorcinol diglycidylether and cyclohexanedimethanoldiglycidylether; bisphenol F epoxy resins i.e., Shell Epon DPL 862 (bisphenol F-epiclorohydrin epoxy resin); and epoxy phenol novolac resins such as Epalloy 8250 (epoxy novalac resin) from CVC located in Cherry Hill, N.J., Araldite EPN 1139 from Ciba Geigy, and DEN432 and DEN438 from Dow Chemical. These epoxide resins display good chemical resistance. Suitable nonaromatic epoxy resins include hydrogenated cyclohexane dimethanol and diglycidyl ethers of hydrogenated Bisphenol A-type epoxide resin, such as: Epon 1510, Epon 4080E, Heloxy 107 and Epon 1513 (hydrogenated bisphenol A-epichlorohydrin epoxy resin) from Shell Chemical in Houston, Tex.; Santolink LSE-120 from Monsanto located in Springfield, Mass.; Epodil 757 (cyclohexane dimethanol diglycidylether) from Pacific Anchor located in Allentown, Pa.; Araldite XUGY358 and PY327 from Ciba Geigy located in Hawthorne, N.Y.; Epirez 505 from Rhone-Poulene located in Louisville, Ky.; Aroflint 393 and 607 from Reichold located in Pensacola, Fla.; and ERL4221 from Union Carbide located in Tarrytown, N.Y. Other suitable non-aromatic epoxy resin include DER 732 and DER 736.

Suitable epoxy-functional acrylic resins include glycidyl ether functional polymers, glycidyl methacrylate (GMA) functional resins, and any epoxy-functional materials, e.g., epoxidized Soya bean oil or the like. Preferred epoxy-functional acrylic resins include those available, for example, from Akzo Nobel Resins under the product name Setalux and, more specifically, Setalux 8503 SS60 (epoxide equivalent weight of approximately 569); and from Nuplex under the product name ACR, such as ACR531XD.

As noted above, epoxy-functional silane resins are useful for forming compositions of this invention. A preferred epoxy-functional silane resin is one available, for example, from OSi Specialties, Inc., of Danbury, Connecticut under the product name Silquest A-187 (a gamma-glycidoxypropyltrimethoxysilane).

An epoxy resin can be used as the epoxy-functional ingredient in certain situations where a desired degree of epoxy reactivity is desired. For example, epoxy resins comprising epoxy-functionalized cycloaliphatic rings (secondary functionalized epoxy groups) may be less reactive than other forms of epoxy-functional ingredient.

An epoxy-functional acrylic resin can be used as the epoxy-functional ingredient in those circumstances where an interpenetrating polymer network (IPN) is desired. For example, epoxy-functional acrylic resins can form an IPN via reaction of the epoxy functionality with curing agent provided in the form of an aminosilane.

An epoxy-functional silane can be used as the epoxy-functional ingredient in circumstances calling for the formation of an adducted ingredient. For example, in certain formulations, where the curing agent is provided in the form of a secondary amine, such secondary amine can be adducted with an epoxy-functional silane. In an example embodiment, the adduct resulting from this combination can be in the form of a molecule that is difunctional in primary amine (as a diketimine), and that is also functionalized as a trimethoxy silane. This in effect creates a "star" polymer, comprising a central nitrogen atom having a two carbon linkages extending therefrom that each include a ketimine end structure, and including, a third carbon linkage extending therefrom that includes trialkoxy-functionality extending therefrom, e.g., from an Si atom when the epoxy-functional ingredient is provided in the form of an epoxy-functional silane. Such star polymer has a triagonal center (120 degrees around Nitrogen), and provides combined properties of high functionality but exceptionally low viscosity and VOC. The star polymer can be an epoxy silane or an epoxy-functional resin.

In an example embodiment, in the range of from about 1 to 50 pbwt of the epoxy-functional ingredient, and preferably in the range of from about 2 to 40 pbwt, is used to form fast-curing modified siloxane compositions of this invention based on the total weight of the composition. A particularly preferred fast-curing modified siloxane composition of this invention comprises in the range of from about 5 to 35 pbwt epoxy-functional ingredient.

Curing Agent

With respect to the curing agent, suitable curing agents useful for preparing fast-curing modified siloxane compositions of this invention include those selected from the group including amines, aminosilanes, ketimines, aldimines, and mixtures thereof. The curing agent is used for the purpose of reacting with the acetoacetate-functional ingredient and/or acrylate-functional ingredient, upon combination of all of the ingredients, for the purpose of forming an enamine structure (when an acetoacetate-functional ingredient is used) in the fast-curing modified siloxane composition that contributes to the desired properties of impact resistance, flexibility, weatherability, corrosion and chemical resistance. The curing agent also reacts with any epoxy-functional ingredient.

Suitable amines useful for forming fast-curing modified siloxane compositions of this invention include amines and polyamines, aliphatic amine adducts, polyamidoamines, cycloaliphatic amines and polyamines, and cycloaliphatic amine adducts, and aromatic amines. Suitable polyamines include those described in U.S. Pat. No. 3,668,183, which is incorporated herein by reference. Preferred amine curing agents include primary amines, cycloaliphatic diamines, isophorone diamines, and other secondary amines such as those available, for example, from Air Products of Allentown, Pa., under the product name Ancamine and, more specifically, Ancamine 2457; from Huntsman of Houston Tex., under the product name XTJ-590 (a reactive polyether diamine); and primary amines such as those available from Huntsman under the product name Jeffamine and, more specifically, Jeffamine D400 (polyoxypropylenediamine) to Jeffamine D2000.

Suitable aminosilanes useful for forming fast-curing modified siloxane compositions of this invention include those having the general formula

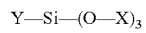

where Y is H(HNR)$_c$ and where "c" is an integer of from 1 to 6, each R is a difunctional organic radical independently selected from the group consisting of aryl, alkyl, dialkylaryl, alkoxyalkyl, and cycloalkyl radicals, and where R can vary within each Y molecule. Each X can be the same or different, and is limited to alkyl, hydroxyalkyl, alkoxyalkyl and hydroxyalkoxyalkyl groups containing less than about six carbon atoms.

Preferred aminosilanes include, but are not limited to: aminoethyl aminopropyl triethoxysilane, n-phenylaminopropyl trimethoxysilane, trimethoxysilylpropyl diethylene triamine, 3-(3-aminophenoxy)propyl trimethoxy silane, amino ethyl amino methyl phenyl trimethoxy silane, 2 amino ethyl 3 aminopropyl, tris 2 ethyl hexoxysilane, n-aminohexyl aminopropyl trimethoxysilane, trisaminopropyl trismethoxy ethoxy silane, gamma-aminopropyltrimethoxysilane gamma-aminopropyltriethoxysilane gamma-aminopropymethyldimethoxysilane, N-beta-(aminoethyl)-gamma-aminopropyltrimethoxysilane, N-beta-(aminoethyl)-gamma-aminopropyltriethoxysilane, and N-beta-(aminoethyl)-gamma-aminopropymethyldimethoxysilane.

The manufacturers and product names of some aminosilanes useful in the present invention include: Z6020, Z6011, XI-6100, and X16150 manufactured by Dow Corning; Silquest A1100, A1101, A1102, A1108, A1110, A1120, A1126, A1130, A1387, Y9632, A1637, A-2120 and A2639, and CoatOSil 2810 manufactured by GE; ED117 manufactured by Wacker; Dynasylan AMMO, AMEO-P, AMEO-T, DAMO, TRIAMO, 1122, 1126, 1146, 1189, 1204, 1411 and 1505 all manufactured by Degussa; and KBE-602, KBE-603 and KBE-903 manufactured by Shin-Etsu. Preferred aminosilanes are difunctional silanes that include aminoethylaminopropyltrimethoxysilane, aminopropyltrimethoxysilane and aminopropyltriethoxysilane. Particularly preferred aminosilanes are GE's A1110 and A1120.

Suitable ketimines or aldimines useful for forming fast-curing modified siloxane compositions of this invention include those obtained by the reaction of an amine with either a ketone or an aldehyde, respectively, and include diketimines and dialdimines such as those described in U.S. Pat. No. 3,668,183. Preferred ketimines include those available, for example, from Air Products under the product name 2457 (dimethylisobutyl ketone ketimine of diethylenetriamine); from Bayer of Leverkusen, Germany under the product name LS2965 (dimethylisobutyl ketone ketimine of isophorone diamine); and from Asahi Denka under the product names EH-235-RS-A and KBE-9103 (ketiminopropyltriethoxysilanes) from Shine-Etsu. A preferred aldimine includes a dialdimine of isophorone diamine one that is available. for example, from Huls of Germany under the product name A139.

The type of curing agent that is selected to forming fast-curing modified siloxane compositions of this invention will depend on the particular type of application and type of other ingredients that will be used. For example, fast-curing modified siloxane compositions of this invention can be formed using a combination of more than one type of curing agent. For example, a primary and/or secondary amine can be used in conjunction with an aminosilane. Additionally, polyether amino-functional amines can be used to flexibilize the curative package and/or also reduce the raw material cost of the curative materials. Secondary amines can be used to adduct epoxy functionality and to form a highly reactive polymer, e.g., the star polymer as disclosed above. The star polymer can formed by adducting a secondary amine with an epoxy silane or an epoxy-functional resin.

Aminosilanes are useful for forming fast-curing modified siloxane compositions of this invention because they react with acetoacetate, acrylate, and epoxy functionality to form IPN structures. Amines and ketimines need to react with epoxy-functional silanes to form IPN structures.

Ketimines or aldimines are useful for forming fast-curing modified siloxane compositions of this invention when it is desired to reduce raw material costs and/or improve the composition pot life. If desired, aminosilane can be hybridized with a ketimine or aldimine to increase pot life and/or to reduce raw material costs.

In an example embodiment, in the range of from about 1 to 30 pbwt of the curing agent, and preferably in the range of from about 2 to 25 pbwt, is used to form fast-curing modified siloxane compositions of this invention based on the total weight of the composition. A particularly preferred fast-curing modified siloxane composition of this invention comprises in the range of from about 5 to 18 pbwt curing agent. It is understood that one or more of the above-described curing agents can be used depending on the particular desired method for making the composition, and the desired properties for the resulting cured film coating, with the total amount of such curing agent used being within the above-identified range.

Organometallic Catalyst

With respect to the organometallic catalyst, suitable organometallic catalysts are useful for the purpose of further accelerating the curing rate of the composition into a protective film coating over a broad temperature range. In certain use applications calling for ambient temperature cure of the composition, the organometallic catalyst is also useful for providing accelerated cure rates at such ambient temperature cure conditions. Suitable catalysts include those having the general formula

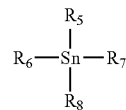

where $R_5$ and $R_6$ are each selected from the group consisting of alkyl, aryl, and alkoxy groups having up to eleven carbon atoms, and where $R_7$ and $R_8$ are each selected from the same groups as $R_5$ and $R_6$, or from the group consisting of inorganic atoms such as halogens, sulphur or oxygen. Example catalysts include organotin materials such as dibutyl tin dilaurate, dibutyl tin diacetate, organotitanates. A preferred organometallic catalyst is dibutyl tin dilaurate.

In an example embodiment, up to about 10 pbwt of the organometallic catalyst, and preferably in the range of from about 0.02 to 5 pbwt, is used to form fast-curing modified siloxane compositions of this invention based on the total weight of the composition. A particularly preferred fast-curing modified siloxane composition of this invention comprises in the range of from about 0.08 to 2 pbwt organometallic catalyst.

Other Ingredients

Moisture scavengers can be used to form fast-curing modified siloxane compositions of this invention for the purpose of intentionally reducing the presence of excess water, for example, during stages of forming the fast-curing modified siloxane composition where excess water is not desired. This can help to control or prevent unwanted hydrolysis of the silicone intermediate, the silane or the curing agent (if provided in the form of an aminosilane) prior to such ingredients being exposed to moisture and, thereby controlling the degree of polycondensation that occurs before the product is put into use, e.g., while the product is on the shelf to increase shelf life.

Suitable moisture scavenging ingredients include those such as calcium compounds like $CaSO_4$-$\frac{1}{2}H_2O$ and calcium-metal alkoxides like tetraisopropyltitanate, tetra n butyl titanate-silanes, QP-5314, vinylsilane (A171), and organic alkoxy compounds like triethylorthoformate, methylorthoformate, dimethoxypropane. In an example embodiment, a preferred moisture scavenging ingredient is triethylorthoformate available, for example, from Bayer under the product name additive OF.

In an example embodiment, up to about 10 pbwt, and preferably in the range of from about 0.25 to 5 pbwt, of the moisture scavenger can be used to form fast-curing modified siloxane compositions of this invention. In a preferred embodiment, in the range of from 0.5 to 2 pbwt of the moisture scavenger can be used based on the total weight of the composition.

In addition to the moisture scavenger, other ingredients useful in forming fast-curing modified siloxane compositions of this invention include water, solvents, plasticizers, extenders, fillers and color pigments, hydrocarbon resin modifiers, and various types of additives such as UV stabilizers, pigment wetting agents, flow and leveling additives, thixatropes, defoamers and the like.

Water is an important ingredient of the present invention and should be present in an amount sufficient to hydrolyze the silicone intermediate, the silane and any curing agent in the form of an aminosilane, to ready these ingredients for subsequent condensation. Additionally, the presence of water operates to unblock any curing agent present in the form of a ketimine and/or aldimine, i.e., to expose the amine functionality for subsequent cross linking with the acetoacetate-functional and/or acrylate-functional ingredient via nucleophillic attack and/or for reaction with the epoxy functional ingredient.

Because the reaction of the amine reactive ingredient (when in the form of an acetoacetate-functional ingredient) with the curing agent operates to generate water, this water operates to cause further hydrolysis of the silicone intermediate, the silane, and any curing agent in the form of an aminosilane, as well as operates to unblock any curing agent provided in the form of a ketimine or aldimine. Thus, such generated water promotes an autocatalytic effect in the formation of the fast-curing modified siloxane composition, which aids in driving the reaction to completion in a reduced amount of time.

The sources of water can be from a reaction between ingredients, atmospheric humidity, and water present in one or more of the ingredients such as the pigment or additive ingredients. Water may be added during the formation of the composition to accelerate cure depending on the particular cure conditions, e.g., such as the use of the composition in arid environments where cure takes place at ambient temperature conditions.

Fast-curing modified siloxane compositions of this invention may comprise a sufficient amount of water to facilitate unblocking of any curing agent present in the form of a ketimine or aldimine for subsequent cross linking, and/or to hydrolyze any alkoxy functionality in the silicone intermediate, silane ingredient, and curing agent provided in the form of an aminosilane. Regardless of its source, water exceeding an optimum amount is undesirable since excess water can cause an undesired degree of hydrolytic polycondensation before use of the composition (reducing pot life), and can operate to reduce the surface gloss of the finally-cured film coating.

Organic solvents can be added if desired to improve atomization and application with electrostatic spray equipment or to improve flow and leveling and appearance when the composition is applied by brush, roller, or standard air and airless spray equipment. Example solvents useful for this purpose include esters, ethers, alcohols, ketones, glycols and the like. Preferred organic solvent useful for forming fast-curing modified siloxane compositions of this invention include n-butanol, xylene, and methoxypropanol. Up to about 25 pbwt organic solvent can be used to form fast-curing modified siloxane compositions of this invention.

Pigments and/or fillers may be used in forming fast-curing modified siloxane composition of this invention. Suitable pigments may be selected from organic and inorganic color pigments which may include titanium dioxide, carbon black, lampblack, zinc oxide, natural and synthetic red, yellow, brown and black iron oxides, toluidine and benzidine yellow, phthalocyanine blue and green, and carbazole violet, and extender pigments including ground and crystalline silica, barium sulfate, magnesium silicate, calcium silicate, mica, micaceous iron oxide, calcium carbonate, zinc powder, aluminum and aluminum silicate, gypsum, feldspar and the like.

The amount of pigment that is used to form the composition is understood to vary, depending on the particular composition application, and can be zero when a clear composition is desired. If desired, fast-curing modified siloxane compositions of this invention can include up to about 50 pbwt pigments based on the total weight of the composition.

When it is desired that compositions of this invention exhibit resistance to high temperatures, a finely divided particulate pigment or filler can be used. Examples of fillers providing high heat resistance are barytes (barium sulfate), mica, micaceous iron oxide, aluminum flake, glass flake, stainless steel flake, and the like. By a proper selection of the binder and filler, heat-stable coatings resistant to temperatures around 300° C. can be achieved. If desired, fast-curing modified siloxane compositions of this invention can include up to about 10 pbwt filler based on the total weight of the composition.

Fast-curing modified siloxane composition of this invention may also contain rheological modifiers, plasticizers, antifoam agents, thixotropic agents, pigment wetting agents, bituminous and asphaltic extenders, antisettling agents, diluents, UV light stabilizers, air release agents and dispersing aids. A preferred fast-curing modified siloxane composition of this invention may comprise up to about 10 pbwt such modifiers and agents.

Fast-curing modified siloxane compositions of the present invention can be supplied as a two-component or two-package system in moisture proof containers. Generally speaking, Part "A" or a first package or component can include: the silicone intermediate, any optional silane, and the acetoacetate-functional ingredient and/or acrylate-functional ingredient; and Part "B" or a second package or component can include the curing agent. If desired, the silicone intermediate can be present in either or both of the first and second packages.

Generally, when the two components or packages are combined in the presence of water, any curing agent provided in the form of a ketimine or aldimine is unblocked to expose amine functionality. The silicone intermediate, any silane, and any curing agent in the form of an aminosilane comprising alkoxy groups undergoes hydrolysis in the presence of water, and polycondensation with themselves and with one another.

To the extent that the polycondensation product includes amine functionality it, as well as any free aminosilane, can adduct with the acetoacetate-functional ingredient and/or acrylate-functional ingredient. Additionally, to the extent that the polycondensation product includes amine functionality it, as well as any free aminosilane, can adduct with the epoxy-functional ingredient. Additionally, to the extent that the epoxy-functional ingredient or the acetoacetate-functional ingredient and/or acrylate-functional ingredient includes amine functionality, these ingredients can adduct with one another.

Any adducting between the acetoacetate-functional ingredient and/or acrylate-functional ingredient, and/or between the epoxy-functional ingredient, and any aminosilane or any amine-containing polycondensation product can take place before, after, or during hydrolysis and polycondensation of the aminosilane and/or silicone intermediate alkoxy or hydroxy groups. It is theorized that substantial cross linking reactions take place through the hydrolysis and polycondensation of such aminosilane and/or silicone intermediate alkoxy and hydroxy groups, thereby contributing to the overall cross-linked chemical structure and properties of the resulting cured film coating. As used herein, the term "cross-linked" is intended to refer to branching bonds formed between polymer chains as well as chain extending bonds formed between polymer chains.

To the extent that the curing agent is provided in the form of a ketimine or aldimine, these reactions are autocatalytic (in the event that the amine-reactive ingredient includes an acetoacetate-functional ingredient) in the sense that amine and acetoacetate reaction produces water that is used to cause further unblocking of the ketimine or aldimine curing agent, useful for further acetoacetate reaction. This autocatalytic effect operates to drive the reaction, thereby contributing to the decreased cure rate of the composition inherent in the amine/acetoacetate reaction.

Since the reaction between the amine and the acetoacetate-functional ingredient and/or the acrylate-functional ingredient is faster than that of the amine/epoxy reaction, compositions of this invention display a significantly faster drying and cure time when compared to conventional epoxy-polysiloxane compositions.

In an example embodiment, assuming a relative humidity of approximately 70 percent and a room temperature of approximately 25° C., once the two components are combined, a desired dust free film can be formed in as little as 5 minutes, a desired tack free film can be formed in as little as 10 minutes, and a desired print free film can be formed in as little as 45 minutes. It is to be understood that the particular curing times for compositions of this invention can and will vary depending on the types of ingredients chosen, the amounts of the ingredients used, the cure temperature and humidity conditions, and the desired final properties of the cured film.

In any case, these curing times represent a significant reduction, when compared to conventional siloxane coating compositions, e.g., epoxy-polysiloxane compositions, that are known to provide a dust free film in about 1 hour, a tack free film in about 1½ hours, and a print free film in about 3½ hours. The reduced cure time realized by compositions of this invention operates to drastically reduce the amount of time necessary to complete the task of coating a particular substrate, thereby reducing the time for keeping the substrate out of service.

The combined ingredients used for forming fast-curing modified siloxane compositions of this invention are preferably provided in a moisture proof container to control or prevent unwanted evaporation and/or hydrolysis and condensation of the constituent chemical ingredients, thus increasing the shelf life of the mixture. Sealed metal cans are suitable.

Compositions of this invention can be applied to a desired substrate surface to protect it from weathering, impact, and exposure to corrosion and/or chemical. Illustrative of substrates that can be treated using compositions of this invention include wood, plastic, concrete, vitreous surfaces, and metallic surfaces. Compositions of this invention are useful as a top coating disposed either directly onto the substrate surface itself or disposed onto a prior or other underlying coating. e.g., an inorganic or organic primer material, disposed on the substrate surface to achieve a desired purpose.

Compositions of this invention can be applied to a surface to be treated by conventional techniques such as spraying or brushing or the like, and are usually applied in films of from about 50 to 250 micrometers or in some embodiments up to about 1.2 millimeters in thickness. If necessary, multiple layers can be applied to the surface to be protected. For use with a wooden substrate, e.g., in the furniture industry, a preferred dry film thickness of about 75 to about 125 micrometers provides a desired degree of protection to the underlying surface.

Fast-curing modified siloxane compositions of this invention can be formulated to provide the desired accelerated drying and cure times over a broad range of temperature conditions, e.g., under conditions of elevated temperature such as when the applied composition is subjected to a bake condition, and at ambient temperature conditions such as when the applied composition is subjected to temperature conditions that can and will vary depending on the temperature of the surrounding environment (e.g., that can vary from 5 to 50° C.).

Fast-curing modified siloxane compositions of the invention will be better understood with reference to the following illustrative examples.

EXAMPLE NO. 1

Fast-Cure Acrylic Epoxy Modified Siloxane Composition

A first component or Part "A" used to make this particular fast-curing modified siloxane composition was prepared according to the following process. A first step involves the formation of a small amount of adducted material that has proven useful as a compatiblizing medium for combination with further ingredients. The compatiblizing medium is formed by combining the following ingredients; approximately 3.34 grams (g) xylene, 1.28 g n-butanol, 1.73 g silane (QP8-5314), 0.85 g aminosilane (A1110), 0.056 g acetoacetate-functional oligomer (K-Flex XM7301), 0.3 g acetoacetate-functional acrylic polymer (Setalux 7202 XX50), and 1.27 g epoxy-functional acrylic resin (Setalux 8503 SS60). These materials were left to equilibrate for a period of approximately 24 hours at room temperature.

During this period of time, the amino functionality of the aminosilane ingredient reacts with both the acetoacetate functionality of the acetoacetate-functional ingredient and with the epoxy functionality of the epoxy-functional ingredient to form an enamine, while releasing water that operates to hydrolyze the alkoxy functionality of the silane and aminosilane ingredients helping to produce Si—O—Si linkages that operate to form an enamine/epoxy siloxane material.

A tint base is then prepared from a mixture of the following ingredients; approximately 5.67 g epoxy resin (Epon-4080E), 0.44 g methoxy propanol, 17.4 g $TiO_2$ white pigment, and 2.76 g wetting and dispersing additives, surface tension modifiers, and light stabilizers.

The compatiblizing medium and tint base are combined with the following ingredients to complete the first component or Part "A"; approximately 12 g alkoxy-functional silicone intermediate (DC-3074), 1.15 g acetoacetate-functional oligomer (K-Flex XM7301), 7 g acetoacetate-functional acrylic polymer (Setalux 7202 XX50), 26.27 g epoxy-functional acrylic resin (Setalux 8503 SS60), and 0.25 g wetting and dispersing additives.

A second component or Part "B" used to make this particular fast-curing modified siloxane composition was prepared by combining the following ingredients; approximately 5.8 g aminosilane (A1110), 0.5 g organometallic catalyst (dibutyl tin dilaurate), 8.6 g n-butanol, and 3.6 g xylene.

The fast-curing modified siloxane composition of this example is provided by combining and mixing together the ingredients of the first and second components, thereby forming an acrylic epoxy modified siloxane composition. Once this composition is provided, the ingredients provided therein undergo cure reactions to form a desired protective film coating. During these cure reactions the aminosilane in the second component reacts with the acetoacetate-functional ingredients to form an alkoxysilane-functional acrylic enamine, the aminosilane in the second component reacts with the epoxy-functional ingredient to form an alkoxysilane-functional epoxy resin, and the alkoxysilane-functional acrylic enamine and alkoxysilane-functional epoxy resin react with the alkoxy-functional silicone intermediate in the presence of moisture and the organometallic catalyst via hydrolysis and polycondensation. In this example, these reactions occur at ambient temperature.

At the completion of these reactions, a finally-cured protective film is produced having a fully cross-linked acrylic enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic epoxy enamine polysiloxane.

The composition provided by combining the first and second components of this example together had a VOC of approximately 420 g/l (thinned), had approximately 38 percent silicon (on total resin solids), and 50 percent by volume solids when mixed and thinned for application. Properties of drying time, hardness and chemical resistance for the formulation of this example are provided in the tables at the end of the examples.

EXAMPLE NO. 2

Fast-Cure Acrylic Epoxy Modified Siloxane Composition

A first component or Part "A" used to make this particular fast-curing modified siloxane composition was prepared by combining the following ingredients together; approximately 24.24 g $TiO_2$, 13.66 g alkoxy-functional silicone intermediate (DC-3074), 1 g silane (QP8-5314), 1 g moisture scavenger (triethylorthoformate), 2.73 g wetting and dispersing additives, and surface tension modifiers, 5.71 g acetoacetate-functional acrylic polymer (ACR441XD(C)), 31.6 g epoxy-functional acrylic resin (ACR531XD), 1.5 g acetoacetate functional oligomer (BEPD), 0.5 g organometallic catalyst (dibutyl tin dilaurate), 6.23 g n-butanol, and 6.23 g xylene.

A second component or Part "B" used to make this particular fast-curing modified siloxane composition included approximately 5.6 g aminosilane (A1110).

The fast-curing modified siloxane composition of this example is provided by combining and mixing together the ingredients of the first and second components, thereby forming an acrylic epoxy modified siloxane composition. Once this composition is provided, the ingredients provided therein undergo cure reactions to form a desired protective film coating. During these cure reactions the aminosilane in the second component reacts with the acetoacetate-functional ingredients to form an alkoxysilane-functional acrylic enamine, the aminosilane in the second component reacts with the epoxy-functional ingredient to form an alkoxysilane-functional epoxy resin, and the alkoxysilane-functional acrylic enamine and alkoxysilane-functional epoxy resin react with the alkoxy-functional silicone intermediate in the presence of moisture and the organometallic catalyst via hydrolysis and polycondensation. In this example, these reactions occur at ambient temperature.

At the completion of these reactions, a finally-cured protective film is produced having a fully cross-linked acrylic enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic epoxy enamine polysiloxane.

A feature of this particular formulation is the intentional selection and use of chemical ingredients that are chemically incompatible and/or that have reaction rates that are different from one another. In an example embodiment, the selected chemical ingredients can be the acetoacetate-functional ingredient and the epoxy-functional ingredient. It has been discovered that the use of ingredients having such properties of incompatibility and/or different reaction rates is desired for the purpose of providing a cured film coating having a low degree of gloss.

In this particular example, the incompatible chemical ingredients used to produce a desired low gloss effect are the acetoacetate-functional acrylic polymer (ACR441XD(C)) and the epoxy-functional acrylic resin (ACR531XD), wherein the acetoacetate-functional acrylic polymer displays a rate of reaction with the amine curing agent that is faster than that of the epoxy-functional acrylic resin. It is believed that the chemical incompatibility and/or different reaction rates of these two ingredients operate to provide a cured film coating having a low degree of gloss in the following manner. As the surface of the coating is cured, two competing reactions are occurring. The rapid curing acetoacetate/amine reaction causes the film to shrink or pull together on the surface as the underlying surface is still uncured or soft. This produces a wrinkling or mircowrinkling effect that is visible under a microscope and provides the basis for a low gloss film or microwrinkle. Alternatively, such low gloss effect may be had by the selective choice and use of different amine reactive ingredients having different amine reaction rates, e.g., by using a mixture of acetoacetate-functional ingredient and acrylate-functional ingredient.

The formulation prepared by combining the first and second components of this example together had a VOC of approximately 386 g/l (thinned), had approximately 30 percent silicon (on total resin solids), and 52 percent by volume solids when mixed and thinned for application. Properties of drying time, hardness and chemical resistance for the formulation of this example are provided in the tables at the end of the examples.

EXAMPLE NO. 3

Fast-Cure Acrylic Epoxy Modified Siloxane Composition

A first component or Part "A" used to make this particular fast-curing modified siloxane composition was prepared by combining the following ingredients; approximately 27.34 g $TiO_2$, 15.4 g alkoxy-functional silicone intermediate (DC-3074), 1 g silane (QP8-5314), 1 g moisture scavenger (triethylorthoformate), 3 g wetting and dispersing additives, and surface tension modifiers, 13 g acetoacetate-functional acrylic polymer (Croda CSA582), 12.9 g acetoacetate-functional oligomer (BEPD), and 1 g organometallic catalyst (dibutyl tin dilaurate).

A second component or Part "B" used to make this particular fast-curing modified siloxane composition was prepared by combining the following ingredients; approximately 5.4 g epoxy-functional silane resin (A187), 6.1 g secondary amine curing agent (Ancamine 2457), 8.2 g aminosilane (A1110), and 6.2 g alkoxy-functional silicone intermediate (DC-3074). The ingredients in this second component were stirred at room temperature for approximately 24 hours for the purpose of adducting the epoxy-functional silane resin (A187) with the secondary amine curing agent (Ancamine 2457), e.g., forming the above-noted star polymer having both amine and alkoxy functionality.

The fast-curing modified siloxane composition of this example is provided by combining and mixing together the ingredients of the first and second components, thereby forming an acrylic epoxy modified siloxane composition. Once this composition is provided, the ingredients provided therein undergo cure reactions to form a desired protective film coating. During these cure reactions the aminosilane (A1110) and amine-functional star polymer of the second component react with the acetoacetate-functional ingredients (Croda CSA582 and BEPD) in the first component to produce an alkoxysilane-functional acrylic enamine. The alkoxysilane-functional acrylic enamine, the star polymer, and the alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylic enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic epoxy enamine polysiloxane.

The formulation prepared by combining the first and second components of this example together had a reduced VOC when compared to the formulations of Examples 1 and 2; specifically, having a VOC of approximately 176 g/l. This formulation had approximately 53 percent silicon (on total resin solids), and 77 percent by volume solids when mixed and thinned for application. Properties of drying time, hardness, weatherability, flexibility, impact resistance and chemical resistance for the formulation of this-example are provided in the tables at the end of the examples.

EXAMPLE NO. 4

Fast-Cure Acrylic Epoxy Modified Siloxane Composition

A first component or Part "A" used to make this particular fast-curing modified siloxane composition was prepared by combining the following ingredients; approximately 27.8 g $TiO_2$, 15 g alkoxy-functional silicone intermediate (DC-3074), 1 g silane (QP8-5314), 1 g moisture scavenger (triethylorthoformate), 3 g wetting and dispersing additives, and surface tension modifiers, 12.6 g acetoacetate-functional acrylic polymer (Croda CSA582), 11.8 g acetoacetate-functional oligomer (BEPD), and 1 g organometallic catalyst (dibutyl tin dilaurate).

A second component or Part "B" used to make this particular fast-curing modified siloxane composition was prepared by combining the following ingredients; approximately 5.3 g epoxy-functional silane resin (A187), 6 g secondary amine curing agent (Ancamine 2457), 10 g aminosilane (A1120), and 6 g silicone intermediate (DC-3074). The ingredients in this second component were stirred at room temperature for approximately 24 hours for the purpose of adducting the epoxy-functional silane resin (A187) with the secondary amine curing agent (Ancamine 2457), e.g., forming the above-noted star polymer having both amine and alkoxy functionality.

The fast-curing modified siloxane composition of this example is provided by combining and mixing together the ingredients of the first and second components, thereby forming an acrylic epoxy modified siloxane composition. Once this composition is provided, the ingredients provided therein undergo cure reactions to form a desired protective film coating. During these cure reactions the aminosilane (A1120) and the star polymer reacts with the acetoacetate-functional ingredients (Croda CSA582 and BEPD) in the first component to produce an alkoxysilane-functional acrylic enamine. The alkoxysilane-functional acrylic enamine, the star polymer, and the alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylic enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic epoxy enamine polysiloxane.

The formulation prepared by combining the first and second components of this example together had a reduced VOC when compared to the formulations of Examples 1 and 2; specifically, having a VOC of approximately 134 g/l. This formulation had approximately 54 percent silicon (on total resin solids), and 77 percent by volume solids when mixed and thinned for application. Properties of gloss and color retention, flexibility, and dry times for the formulation of this example are provided in the tables at the end of the examples.

EXAMPLE NO. 5

Fast-Cure Acrylic Epoxy Modified Siloxane Composition

A first component or part "A" used to make this particular fast-curing modified siloxane composition was prepared by combining the following ingredients; approximately 24.5 g TiO2, 13.8 g silicone intermediate (DC-3074), 1 g silane (QP8-5314), 1 g moisture scavenger (triethylorthoformate), 2.6 g wetting and dispersing additives, and surface tension modifiers, 20.7 g acetoacetate-functional acrylic polymer (GPAcryl 613), 14 g epoxy resin (Epon-4080E), and 10.9 g alkoxy-functional silicone intermediate (DC-3074).

A second component or part "B" used to make this particular fast-curing modified siloxane composition was prepared by combining the following ingredients; approximately 3.5 g aminosilane (A1110), 2.2 g aminosilane (A1120), 4.5 g primary amine (Jeffamine D-400) and 1 g organometallic catalyst (dibutyl tin dilaurate).

The fast-curing modified siloxane composition of this example is provided by combining and mixing together the ingredients of the first and second components, thereby forming an acrylic epoxy modified siloxane composition. Once this composition is provided, the ingredients provided therein undergo cure reactions to form a desired protective film coating. During these cure reactions the aminosilanes (A1110 and 1120) and the primary amine (Jeffamine D-400) react with the acetoacetate-functional ingredient to form an alkoxysilane-functional acrylic enamine, and react with the epoxy resin to produce an alkoxysilane-functional epoxy resin. The alkoxysilane-functional acrylic enamine, alkoxysilane-functional epoxy resin, and alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylic enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic epoxy enamine polysiloxane.

The formulation prepared by combining the first and second components of this example together had a reduced VOC when compared to the formulations of Examples 1 and 2; specifically, having a VOC of approximately 120 g/l. This formulation had approximately 43 percent silicon on total resin solids, and 83 percent by volume solids when mixed and thinned for application. Properties of drying time, hardness, weatherability, flexibility, impact resistance and chemical resistance for the formulation of this example are provided in the tables at the end of the examples.

EXAMPLE NO. 6

Fast-Cure Acrylic Epoxy Modified Siloxane Composition

This example is generally similar to that of Example 3 with the exception that a silane (QP8-5314) was not used in its preparation. Accordingly, a first component or Part "A" used to make this particular fast-curing modified siloxane composition was prepared by combining the following ingredients; approximately 27.34 g $TiO_2$, 15.4 g alkoxy-functional silicone intermediate (DC-3074), 1 g moisture scavenger (triethylorthoformate), 3 g wetting and dispersing additives, and surface tension modifiers, 13 g acetoacetate-functional acrylic polymer (Croda CSA582), 12.9 g acetoacetate-functional oligomer (BEPD), and 1 g organometallic catalyst (dibutyl tin dilaurate).

A second component or Part "B" used to make this particular fast-curing modified siloxane composition was prepared by combining the following ingredients; approximately 5.4 g epoxy-functional silane resin (A187), 6.1 g secondary amine curing agent (Ancamine 2457), 8.2 g aminosilane (A1110), and 6.2 g alkoxy-functional silicone intermediate (DC-3074). The ingredients in this second component were stirred at room temperature for approximately 24 hours for the purpose of adducting the epoxy-functional silane resin (A187) with the secondary amine curing agent (Ancamine 2457), e.g., forming the above-noted star polymer having both amine and alkoxy functionality.

The fast-curing modified siloxane composition of this example is provided by combining and mixing together the ingredients of the first and second components, thereby forming an acrylic epoxy modified siloxane composition. Once this composition is provided, the ingredients provided therein undergo cure reactions to form a desired protective film coating. During these cure reactions the aminosilane (A1110) and star polymer reacts with the acetoacetate-functional ingredients (Croda CSA582 and BEPD) in the first component to produce an alkoxysilane-functional acrylic enamine. The alkoxysilane-functional acrylic enamine, the star polymer, and the alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylic enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic epoxy enamine polysiloxane.

The formulation prepared by combining the first and second components of this example together had a reduced VOC when compared to the formulations of Examples 1 and 2; specifically, having a VOC of approximately 176 g/l. This formulation had approximately 53 percent silicon (on total resin solids), and 77 percent by volume solids when mixed and thinned for application. Properties of drying time, hardness, weatherability, flexibility, impact resistance and chemical resistance for the formulation of this example are substantially the same as that provided in the tables at the end of the examples for Example 3.

EXAMPLE NO. 7

Fast-Cure Acrylate Epoxy Modified Siloxane Composition

Unlike the previous example formulations using one or more acetoacetate-functional ingredient, this example formulation is prepared using an acrylate-functional ingredient. A first component or Part "A" used to make this particular fast-curing modified siloxane composition was prepared by combining the following ingredients; approximately 398 g $TiO_2$, 398 g alkoxy-functional silicone intermediate (SY-231), 5 g surfactant (Rhodafac RE-610 surfactant), 5.2 g silicone defoamer (BYK 080), 194 g wollastonite (NYAD 1250), 1.95 g P-tertiary butyl ether solvent (Arcosolv PTB), 4.5 g polyamide thixatrope (Disparlon 600), 5.5 g hindered amine light stabilizer (Tinuvin 292), 5.5 g hindered amine light stabilizer (Sanduvor 3056), 135.4 g epoxy resin (Epon 1510), 165 g acrylate-functional oligomer (Photomer 4006), 11 g flow/leveling additive (BYK 361), and 8 g organometallic catalyst (MetacureT-1/Cotin 227-dibutyltindiacetate). These ingredients were mixed until uniform.

A second component or Part "B" used to make this particular fast-curing modified siloxane composition was prepared by combining per 100 grams of Part A, 15.1 g aminosilane (A1102), and 15 g alkoxy-functional silicone intermediate (DC1-2530).

The fast-curing modified siloxane composition of this example is provided by combining and mixing together the ingredients of the first and second components, thereby forming an acrylate epoxy modified siloxane composition. Once this composition is provided, the ingredients provided therein undergo cure reactions to form a desired protective film coating. During these cure reactions the aminosilane (A1102)

reacts both with the acrylate-functional ingredient (Photomer 4006) in the first component to produce an alkoxysilane-functional acrylate oligomer, and with the epoxy resin to form an alkoxysilane-functional epoxy resin. The alkoxysilane-functional acrylate oligomer, the alkoxysilane-functional epoxy resin, and the alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylate polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylate epoxy polysiloxane.

This particular formulation is a high-build cross-linked acrylate epoxy polysiloxane coating with excellent weatherability and corrosion resistance. A coating formed from this formulation was applied directly onto sandblasted steel panels and had a dry film thickness of approximately 6 mils. The dry film had an initial gloss of 82 at 60 degrees, a gloss retention of 50 percent after 10 weeks QUV-B accelerated weathering exposure, and showed no evidence of blistering or rusting after 2000 hours ASTM B-1 17 salt fog exposure.

EXAMPLE NO. 8

Fast-Cure Acrylate Epoxy Modified Siloxane Composition

This example formulation is similar to that of Example 8, in that it is prepared using an acrylate-functional ingredient. A first component or Part "A" used to make this particular fast-curing modified siloxane composition was prepared by combining the following ingredients; approximately 398 g TiO$_2$, 398 g alkoxy-functional silicone intermediate (SY-231), 5 g surfactant (Rhodafac RE-610 surfactant), 5.2 g silicone defoamer (BYK 080), 194 g wollastonite (NYAD 1250), 1.95 g P-tertiary butyl ether solvent (Arcosolv PTB), 4.5 g polyamide thixatrope (Disparlon 600), 5.5 g hindered amine light stabilizer (Tinuvin 292), 5.5 g hindered amine light stabilizer (Sanduvor 3056), 135.4 g epoxy resin (Eponex 1510), 151 g acrylate-functional oligomer (Photomer 4127), 11 g flow/leveling additive (BYK 361), and 8 g organometallic catalyst(MetacureT-1/Cotin 227). These ingredients were mixed until uniform.

A second component or Part "B" used to make this particular fast-curing modified siloxane composition was prepared by combining per 100 grams of Part A, 8.4 g aminosilane (Z-6020).

The fast-curing modified siloxane composition of this example is provided by combining and mixing together the ingredients of the first and second components, thereby forming an acrylate epoxy modified siloxane composition. Once this composition is provided, the ingredients provided therein undergo cure reactions to form a desired protective film coating. During these cure reactions the aminosilane (Z-6020) reacts both with the acrylate-functional ingredient (Photomer 4127) in the first component to produce an alkoxysilane-functional acrylic resin, and with the epoxy resin to form an alkoxysilane-functional epoxy resin. The alkoxysilane-functional acrylic resin, alkoxysilane-functional epoxy resin, and alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylate polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylate epoxy polysiloxane.

This particular formulation is a high-build cross-linked acrylate polysiloxane coating with excellent weatherability and corrosion resistance. A coating formed from this formulation was applied directly onto sandblasted steel panels and had a dry film thickness of approximately 6 mils. The dry film had an initial gloss of 86 at 60 degrees, a gloss retention of 81 percent after 10 weeks QUV-B accelerated weathering exposure, and showed excellent corrosion resistance with no evidence of blistering or rusting after 2000 hours ASTM B-117 salt fog exposure.

EXAMPLE NO. 9

Fast-Cure Acrylic Epoxy Modified Siloxane Composition

A first component or Part "A" used to make this particular fast-curing modified siloxane composition is prepared by combining the following ingredients; approximately 27.34 g TiO$_2$, 15.4 g alkoxy-functional silicone intermediate (DC-3074), 1 g silane (QP8-5314), 1 g moisture scavenger (triethylorthoformate), 3 g wetting and dispersing additives, and surface tension modifiers, 6.5 g acetoacetate-functional acrylic polymer (Croda CSA582), 6.5 g acetoacetate-functional oligomer (BEPD), 13 g acrylate-functional oligomer (Photomer 4006), and 1 g organometallic catalyst (dibutyl tin dilaurate).

A second component or Part "B" used to make this particular fast-curing modified siloxane composition is prepared by combining the following ingredients; approximately 5.4 g epoxy-functional silane resin (A187), and 6.1 g secondary amine curing agent (Ancamine 2457). These ingredients in this second component are stirred at room temperature for approximately 24 hours for the purpose of adducting the epoxy-functional silane resin (A187) with the secondary amine curing agent (Ancamine 2457), e.g., forming the above-noted star polymer having both amine and alkoxy functionality. Approximately 8.2 g aminosilane (A1110), and 6.2 g alkoxy-functional silicone intermediate (DC-3074) is then added to these combined and adducted ingredients.

The fast-curing modified siloxane composition of this example is provided by combining and mixing together the ingredients of the first and second components, thereby forming an acrylic epoxy modified siloxane composition. Once this composition is provided, the ingredients provided therein undergo cure reactions to form a desired protective film coating. During these cure reactions the aminosilane (A1110) and star polymer reacts with the acetoacetate-functional ingredients (Croda CSA582 and BEPD) and the acrylate-functional oligomer (Photomer 4006) in the first component to produce an alkoxysilane-functional acrylic enamine and an alkoxysilane-functional acrylic resin. The alkoxysilane-functional acrylic enamine, alkoxysilane-functional acrylate oligomer resin, the star polymer, and the alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylic enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic epoxy enamine polysiloxane.

The formulation prepared by combining the first and second components of this example together has a reduced VOC when compared to the formulations of Examples 1 and 2, and properties of drying time, hardness, weatherability, flexibility, impact resistance and chemical resistance comparable to that of Example No. 3. Additionally, the resulting chemical structure provided in the finally-cure film formed from the composition of this invention example had a lower degree of enamine functionality then the above noted example compositions provided by using only an acetoacetate-functional ingredient, i.e., not including a mixture of acetoacetate and acrylate-functional ingredients.

EXAMPLE NO. 10

Fast-Cure Acrylic Urethane Epoxy Modified Siloxane Composition

A first component or Part "A" used to make this particular fast-curing modified siloxane composition is prepared by combining the following ingredients; approximately 25.95 g $TiO_2$, 21.1 g alkoxy-functional silicone intermediate (DC-3074), 1 g silane (QP8-5314), 1 g moisture scavenger (triethylorthoformate), 0.4 g silicone defoamer (BYK 080), 0.06 g dispersing and wetting agent (BYK 108), 0.4 g dispersing and wetting agent (BYK 163), 1.5 g hindered amine light stabilizer (Tinuvin 292), 11 g acetoacetate-functional urethane polymer (urethane diol acetoacetylted having an equivalent weight of 920), 14.78 g nonaromatic epoxy resin (Epon 4080E having an equivalent weight of approximately 224), 11 g acetoacetate-functional acrylic polymer (GPAcryl 613 having an equivalent weight of approximately 920).

A second component or Part "B" used to make this particular fast-curing modified siloxane composition is prepared by combining the following ingredients; approximately 2.5 g epoxy-functional silane resin (A187), and 2.8 g secondary amine curing agent (Ancamine 2457). These ingredients in this second component are stirred at room temperature for approximately 24 hours for the purpose of adducting the epoxy-functional silane resin (A187) with the secondary amine curing agent (Ancamine 2457), e.g., forming the above-noted star polymer having both amine and alkoxy functionality. Approximately 3.7 g aminosilane (A1110) is added to these combined and adducted ingredients The fast-curing modified siloxane composition of this example is provided by combining and mixing together the ingredients of the first and second components, thereby forming an acrylic urethane epoxy modified siloxane composition. Once this composition is provided, the ingredients provided therein undergo cure reactions to form a desired protective film coating. During these cure reactions, the aminosilane (A1110) and the star polymer react with the acetoacetate-functional urethane ingredient in the first component to produce an alkoxysilane-functional urethane enamine. The alkoxysilane-functional urethane enamine, the star polymer, and the alkoxy-functional silicone intermediate undergo hydrolysis and polycondensation reactions in the presence of moisture and the organometallic catalyst. In this example, these reactions occur at ambient temperature.

At the completion of these reactions, a finally-cured protective film is produced having a fully cross-linked acrylic urethane enamine polysiloxane chemical structure. Since the resulting chemical structure is provided in part by reaction of hydroxyl groups (resulting from epoxide group ring opening) with silanol groups existing or formed in the silane-containing and/or silicone intermediate ingredients, although the epoxide groups are not technically present in the resulting chemical structure, it is to be understood that those skilled in the art may alternatively refer to the resulting chemical structure as being a fully cross-linked acrylic urethane epoxy enamine polysiloxane.

The formulation prepared by combining the first and second components of this example together makes use of urethane to flexiblize while providing a reduced VOC when compared to the formulations of Examples 1 and 2, and properties of drying time, hardness, weatherability, flexibility, impact resistance and chemical resistance comparable to that of Example No. 3.

Fast-curing modified siloxane compositions of this invention were prepared by combining and mixing together the two different components for each of the above-identified example formulations. The combined mixture for each example was then applied by conventional application method to a desired substrate surface to provide a protective film coating thereon. Specifically, for Examples 1 to 5, the resulting compositions were applied by spray technique to a wooden substrate surface and were allowed to cure at ambient temperature conditions (approximately 25° C. and 70 percent relative humidity). It is to be understood that fast-curing modified siloxane compositions of this invention can be useful for providing protective film coatings on a variety of different substrates, such as metal, plastic, wood and the like. Fast-curing modified siloxane compositions of this invention are especially well adapted for use in the furniture industry for providing protective film coatings on wooden substrates.

The fast-curing modified siloxane compositions, prepared according to Examples 1 to 5, were applied using plural component equipment as a top-coat having a thickness of approximately 80 micrometers to a wooden substrate. These example compositions were applied to a substrate surface that was previously treated with a primer coating consisting of Amerlock 2 available from Ameron International Inc., of Pasadena, Calif.

Drying Time Data

The so-applied fast-curing modified siloxane compositions of Examples 1 to 5 were tested for drying time and compared to the drying time of a conventional epoxy-polysiloxane resin composition (PSX-700 available from Ameron International Inc.) as presented below in Table No. 1.

TABLE No. 1

Comparative Drying Times

| Drying time (minutes) | Known Epoxy-Polysiloxane | Example 1 | Example 2 | Example 3 | Example 4 | Example 5 |
|---|---|---|---|---|---|---|
| Dust Free | 75 | 4 | 5 | 15 | 7 | 11 |
| Tack Free | 145 | 31 | 15 | 20 | 12 | 14 |
| Print Free | 235 | 60 | 40 | 30 | 17 | 45 |

As illustrated from the drying data provided in Table No. 1, fast-curing modified siloxane compositions of this invention displayed: (a) dust free drying times that are at least 80 percent, and in some instances 93 percent quicker to dry than that of the known epoxy-polysiloxane; (b) tack free drying times that are at least 80 percent, and in some instances 92 percent quicker to dry than that of the known epoxy-polysiloxane; and (c) print free drying times that are at least 75 percent, and in some instances 93 percent quicker to dry than that of the known epoxy-polysiloxane. The increases in drying times provided by the compositions of this invention are a considerable advance over conventional epoxy-polysiloxane coating compositions, providing significant manufacturing and commercial advantages, e.g., by reducing the amount of time that a treated substrate needs to wait before further processing or before being placed into operation.

Hardness Data

The so-applied fast-curing modified siloxane compositions were also tested for hardness (using Sward hardness) and compared to the hardness of a conventional epoxy-polysiloxane coating composition (PSX-700 available from Ameron International Inc.) as presented below in Table No. 2.

TABLE No. 2

Comparative Sward Hardness

| Sward Hardness (swing counts) | Known Epoxy-Polysiloxane | Example 1 | Example 2 | Example 3 | Example 4 | Example 5 |
|---|---|---|---|---|---|---|
| 0 to 3 days | 10 increasing to 28 | 16 increasing to 24 | 18 increasing to 20 | 16 increasing to 26 | 18 increasing to 28 | 10 increasing to 22 |
| 3 to 7 days | 28 increasing to 33 | 24 increasing to 30 | 20 | 26 increasing to 38 | 28 increasing to 38 | 22 increasing to 30 |
| 7 to 14 days | 33 increasing to 47 | 30 increasing to 34 | 20 | 38 increasing to 50 | 38 increasing to 50 | 30 increasing to 38 |
| 14 plus days | 47 increasing to 54 | 34 | 20 increasing to 22 | 50 increasing to 54 | 50 increasing to 54 | 38 |

As illustrated from the hardness data provided in Table No. 2, fast-curing modified siloxane compositions of this invention displayed: (a) improved early-stage hardness (measured as initial hardness within the 0 to 3 day period) by at least 60 percent, and in some instances by at least 80 percent when compared to that of the known epoxy-polysiloxane; and (b) comparable later stage hardness (measured after day 14) to that of the known epoxy-polysiloxane (except for the formulations of Example Nos. 1 and 2 that demonstrated later stage hardnesses that were somewhat lower than that of the known epoxy-polysiloxane).

This hardness test data demonstrates the fact that fast-curing modified siloxane compositions of this invention have an early stage hardness that exceeds conventional epoxy-polysiloxane compositions, and (depending on the particular formulation) have a later stage hardness that is comparable to that of conventional epoxy-polysiloxane compositions. The fact that compositions of this invention demonstrate improved early stage hardness can be an important feature of formulations of this invention making them especially well suited for protective coating applications calling for such early stage hardness.

Weathering

The so-applied fast-curing modified siloxane compositions of Example Nos. 3 and 4 were also tested for weathering (QUV-B) and compared to the conventional epoxy-polysiloxane composition by measuring gloss over a period of time. Using a gloss rating (60 degree gloss) of 0 to 100 for a period of from 0 to 10 weeks, the compositions of Example Nos. 3 and 4 produced gloss values that were quite similar to that of the conventional epoxy-polysiloxane composition, e.g., varying from the conventional epoxy-polysiloxane composition by within ±5 percent. This data illustrates the fact that fast-curing modified siloxane compositions of this invention are capable of providing weathering characteristics that are comparable to that of conventional epoxy-polysiloxane compositions while also providing the significantly reduced cure rates noted above.

Flexibility

The so-applied fast-curing modified siloxane compositions of Example Nos. 3 and 4 were also tested for flexibility (conical mandrel elongation by measuring percent elongation) and compared to the conventional epoxy-polysiloxane composition. The compositions of Example Nos. 3 and 4 produced a direct pass rating (Joules) of 8 J (Example No. 3), 6 J (Example No. 4) as compared to 3 J for the conventional epoxy-polysiloxane composition (PSX-700). Example No. 5 produced a direct pass of greater than 10 J and a reverse pass of greater than 18 J, illustrating the improved properties of elasticity and flexibility provided by compositions of this invention. This data illustrates the fact that fast-curing modified siloxane compositions of this invention are capable of providing improved flexibility characteristics when compared to conventional epoxy-polysiloxane compositions while also providing the significantly reduced cure rates noted above.

Impact Resistance

The so-applied fast-curing modified siloxane compositions of Example Nos. 3 and 4 were also tested for impact resistance (by measuring the pass rating in Joules in a direct and reverse direction) and compared to the conventional epoxy-polysiloxane composition. The compositions of Example Nos. 3 and 4 produced a direct pass rating (Joules)

that was 167 percent greater and a reverse pass rating (Joules) that was 150 percent greater (Example No. 3) than that of the conventional epoxy-polysiloxane composition, and a direct pass rating (Joules) that was 100 percent greater and a reverse pass rating (Joules) that was 117 percent greater (Example No. 4) than that of the conventional epoxy-polysiloxane composition. This data illustrates the fact that fast-curing modified siloxane compositions of this invention are capable of providing improved impact resistance when compared to conventional epoxy-polysiloxane compositions while also providing the significantly reduced cure rates noted above.

Chemical Resistance

The so-applied fast-curing modified siloxane compositions of these Examples were tested for chemical resistance (methylethylketone-MEK resistance) and compared to that of the conventional epoxy-polysiloxane composition. Each of the example compositions displayed a number of double rubs (greater than 200) that were the same as that of the conventional epoxy-polysiloxane composition. In fact, some of the example compositions displayed greater than 200 double rubs at a coating age (e.g., 34 days) that was less than that (e.g., 3 months) of the conventional epoxy-polysiloxane composition. Accordingly, this data illustrates the fact that fast-curing modified siloxane compositions of this invention are capable of providing a degree of chemical resistance that is comparable to that of conventional epoxy-polysiloxane compositions while also providing the significantly reduced cure rates noted above.

Accordingly, a key feature of fast-curing modified siloxane compositions of this invention is that they enable the above-noted reductions in cure times without sacrificing such desired performance properties as weatherability, hardness, flexibility, impact resistance and chemical resistance of the finally formed film coating when compared to conventional siloxane resin coating compositions, e.g., epoxy-polysiloxane coating compositions.

Although fast-curing modified siloxane compositions of this invention have been described with considerable detail with reference to certain preferred variations thereof, other variations are possible. Therefore, the spirit and scope of the appended claims should not be limited to the preferred variations described herein.

What is claimed is:

1. A fast-curing modified siloxane protective coating composition comprising:

an alkoxy- or silanol-functional silicone intermediate, wherein the alkoxy- or silanol-functional silicone intermediate has the eneral formula

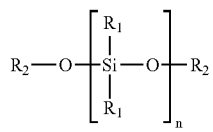

where each $R_1$ is selected from the group consisting of a hydroxy group and alkyl, aryl, and alkoxy groups having up to about six carbon atoms, each $R_2$ is selected from the group consisting of hydrogen and alkyl and aryl groups having up to six carbon atoms, and wherein "n" is selected so that the silicone intermediate have an average molecular weight in the range of from about 400 to about 10 000;

at least one acetoacetate-functional amine reactive ingredient;

an epoxy-functional ingredient;

a curing agent selected from the group consisting of amines, aminosilanes, ketimines, aldimines and mixtures thereof; and water, wherein the acetoacetate-functional amine reactive ingredient undergoes a cross-linking reaction with the curing agent, wherein the combined composition reacts to form a fully cross-linked enamine polysiloxane structure.

2. The composition as recited in claim 1 further comprising a silane or polysiloxane.

3. The composition as recited in claim 1 further comprising an organometallic catalyst.

4. The composition as recited in claim 2 wherein the silane or polysiloxane has the general formula

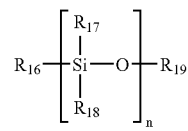

where $R_{16}$, $R_{17}$ and $R_{18}$ are independently selected from the group consisting of hydrogen and alkyl, aryl, cycloalkyl, alkoxy, aryloxy, hydroxyalkyl, alkoxyalkyl and hydroxyalkoxyalkyl groups containing up to six carbon atoms, and where $R_{19}$ is selected from the group consisting of hydrogen and alkyl and aryl groups having up to six carbon atoms, and "n "is in the range of from 1 to 5.

5. The composition as recited in claim 2 including a compatiblizing composition formed by adducting an amount of the combined silane, acetoacetate-funetional ingredient, epoxy-functional ingredient, and curing agent.

6. The composition as recited in claim 1 wherein the amine reactive ingredient is an acetoacetate-functional ingredient selected from the group consisting of acetoacetate-functional diluents, acetoacetate-functional oligomers, acetoacetate-functional polymers, and combinations thereof 7. The composition as recited in claim 6 wherein the acetoacetate-functional polymers are selected from the group consisting of acrylic, polyester, polyethei; and urethane polymers.

8. The composition as recited in claim 6 wherein the composition includes an acetoacetate-functional ingredient and the combined ingredients react to form a fully cross-linked enamine polysiloxane structure suitable for forming a protective film coating.

9. The composition as recited in claim 8 wherein the ingredients react at ambient temperature to fonn the fully cross-linked enamine polysiloxane structure.

10. The composition as recited in claim 1 wherein the epoxy- functional ingredient is selected from the group consisting of epoxy-functional polymers and epoxy-functional diluents.

11. The composition as recited in claim 1 comprising two amine reactive ingredients, wherein each such amine reactive ingredient has a different rate of reaction with the curing agent.

12. The composition as recited in claim $_1$ further comprising ingredients selected from the group consisting of pigments, fillers, solvents, rheological modifiers, plasticizers, antifoam agents, thixotropic agents, wetting agents, antisettling agents, light stabilizers, air release agents, dispensing aids, and combinations thereof 13. A fast-curing modified siloxane composition comprising:
an alkoxy- or silanol-functional silicone intermediate;
at least one amine reactive ingredient selected from the group consisting of aceto acetate-functional ingredients, acrylate-funetional ingredients, and mixtures thereof;
an epoxy-functional ingredient;
a curing agent selected from the group consisting of amines, aminosilanes, ketimines, aldimines and mixtures thereof, and
water,
wherein the amine reactive ingredient is comprises an acetoacetate- functional ingredient having the general chemical formula

$R_{[OCOCH_2COCH_2R_{21}]a}$ where $R_{20}$ is selected from the group consisting of acrylic, polyester, polyether, and urethane polymers and diluents, and any hydroxy-fianetional oligomer or polymer capable of being functionalized with $[OCOCH_2COCH_2R_{21}]$, where "a"is from 1 to 10, and where $R_{21}$ is selected from the group consisting of hydrogen, and carbon-containing groups having up to about 6 carbon atoms, wherein the acetoacetate-frmnctional amine reactive ingredient undergoes a cross-linking reaction with the curing agent.

14. A fast-curing modified siloxarie composition prepared by combining in the presence of water:
an alkoxy- or silanol-functional silicone intermediate; with
an acetoacetate-functional ingredient;
an epoxy-functional ingredient;
and a curing agent selected from the group consisting of arnines, aminosilanes, ketimines, aldirnines and mixtures thereof;
wherein upon combining the ingredients, the acetoacetate-functional ingredient and the epoxy-functional ingredient react with the curing agent and the alkoxy- or silanol-functional silicone intermediate to form a fully cured protective film having a fully cross- linked enamine polysiloxane chemical structure,
wherein the acetoacetate-funetional ingredient has comprises a compound having the general chemical formula $R_{20}[OCOCH_2COCH_2R_{21}]a$ where $R_{20}$ is selected from the group consisting of acrylic, polyester, polyether, and urethane polymers and diluents, and any hydroxy-funetional oligomer or polymer capable of being functionalized with $[OCOCH_2COCH_2R_{21}]$, where "a"is from 1 to 10, and where $R_{21}$ is selected from the group consisting of hydrogen, and carbon-containing groups having up to about 6 carbon atoms.

15. A fast-curing modified siloxane composition prepared by combining in the presence of water:
an alkoxy- or silanol-funetional silicone intermediate; with
an acetoacetate-funetional ingredient;
an epoxy-functional ingredient;
and a curing agent selected from the group consisting of amines, aminosilanes, ketimines, aldimines and mixtures thereof;
wherein upon combining the ingredients, the acetoacetate-functional ingredient and the epoxy-functional ingredient react with the curing agent and the alkoxy- or silanol-functional silicone intermediate to form a fully cured protective film having a fully cross-linked enamine polysiloxane chemical structure,
wherein the acetoacetate-functional polymer is an acrylic polymer, and wherein the chemical structure comprises a fully cross-linked acrylic epoxy enamine polysiloxane.

16. A fast-curing modified siloxane composition prepared by combining in the presence of water:
an alkoxy- or silanol-flinctional silicone intermediate; with
an acetoacetate-fhnctional ingredient;
an epoxy-functional ingredient;
and a curing agent selected from the group consisting of amines, amjnosilanes, ketimines, aldimines and mixtures thereof;
wherein upon combining the ingredients, the acetoacetate-functional ingredient and the epoxy-functional ingredient react with the curing agent and the alkoxy- or silanol-functional silicone intermediate to form a fully cured protective film having a fully cross-linked enamine polysiloxane chemical structure,
wherein the curing agent further includes a secondary amine.

17. A fast-curing modified siloxane composition prepared by combining in the presence of water:
an alkoxy- or silanol-functional silicone intermediate; with
two acetoacetate-functional ingredients, one of which includes an acrylic polymer;
an epoxy-functional ingredient;
and a curing agent selected from the group consisting of amines, aminosilanes, ketimines, aldimines and mixtures thereof;
wherein upon combining the ingredients, the acetoacetate-functional ingredient and the epoxy-functional ingredient react with the curing agent and the alkoxy- or silanol-funetional silicone intermediate to form a fully cured protective film having a frilly cross-linked enamine polysiloxane chemical structure.

18. The composition as recited in claim 17 wherein the epoxy-functional ingredient has a reaction rate that is different than that of one of the acetoacetate-functional ingredients, the difference in reaction rates producing a fully cured protective film having a low degree of surface gloss.

19. A fast-curing modified siloxane composition prepared by combining in the presence of water:
about 5 to 50 percent by weight an alkoxy- or silanol-functional silicone intermediate; with
5 to 30 percent by weight of an acetoacctate-fhnctional ingredient;
1 to 50 percent by weight of an epoxy-functional ingredient; and
1 to 30 percent by weight of a curing agent selected from the group consisting of amines, aminosilanes, ketimines, aldimines and mixtures thereof based on the total weight of the composition;
wherein upon combining the ingredients, the aceto acetate-functional ingredient and the epoxy-functional ingredient react with the curing agent and the alkoxy- or silanol-functional silicone intermediate to form a fully cured protective film having a fully cross-linked enamine polysiloxane chemical structure.

20. A method of making a fully cross-linked modified epoxy polysiloxane comprising the steps of: combining: 5 to 50 percent by weight of an alkoxy- or silanol-functional silicone intermediate; with 5 to 30 percent by weight of an amine reactive ingredient selected from the group consisting acetoacetate-functional ingredients, acrylate-functional ingredients, and mixtures thereot and 1 to 50 percent by weight of an epoxy- functional ingredient; and curing the combined ingredients in the presence of water by adding to them: 1 to 30 percent by weight of a curing agent selected from the group consisting of amines, aminosilanes, ketimines, aldimines and mixtures thereof based on total weight of the composition; wherein during the curing step, the amine reactive ingredient and the epoxy- functional ingredient each react with the curing agent, and the silicone intermediate reacts with the amine reactive ingredient reaction product to provide the fully cross-linked modified epoxy polysiloxane.

21. A fast-curing modified siloxane protective coating composition comprising:
   an alkoxy- or silanol-functional silicone intermediate;
   at least one acetoacetate-functional amine reactive ingredient;
   an epoxy-functional ingredient;
   a curing agent selected from the group consisting of amines, aininosilanes, ketimines, aldimines and mixtures thereof;
   water; and
   a silane or polysiloxane having the general formula

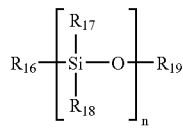

where $R_{16}$, $R_{17}$ and $R_{18}$ are independently selected from the group consisting of hydrogen and alkyl, aryl, cycloalkyl, alkoxy, aryloxy, hydroxyalkyl, alkoxyalkyl and hydroxyalkoxyalkyl groups containing up to six carbon atoms, and where $R_{19}$ is selected from the group consisting of hydrogen and alkyl and aryl groups having up to six carbon atoms) and tin;; is in the range of from 1 to 5,
   wherein the acetoacetate-functional amine reactive ingredient undergoes a cross-linking reaction with the curing agent,
   wherein the combined composition reacts to form a fully cross-linked enamine polysiloxane structure.

22. A fast-curing modified siloxane protective coating composition comprising:
   an alkoxy- or silanol-functional silicone intermediate;
   at least one acetoacetate-functional amine reactive ingredient;
   an epoxy-functional ingredient;
   a curing agent selected from the group consisting of amines, aminosilanes, ketimines, aldimines and mixtures thereof;
   water; and
   a silane or polysiloxane, including a compatiblizing composition formed by adducting an amount of the combined silane, acetoacetate-functional ingredient, epoxy-functional ingredient, and curing agent,
   wherein the acetoacetate-fiinctional amine reactive ingredient undergoes a cross-linking reaction with the curing agent,
   wherein the combined composition reacts to form a fully cross-linked enamine polysiloxane structure.

* * * * *

UNITED STATES PATENT AND TRADEMARK OFFICE
CERTIFICATE OF CORRECTION

| | | |
|---|---|---|
| PATENT NO. | : 7,459,515 B2 | Page 1 of 1 |
| APPLICATION NO. | : 10/943241 | |
| DATED | : December 2, 2008 | |
| INVENTOR(S) | : Louie Herman Gommans et al. | |

It is certified that error appears in the above-identified patent and that said Letters Patent is hereby corrected as shown below:

Col. 29, line 48, change "eneral" to --general--.
Col. 30, line 43, change "polyethei" to --polyether--.
Col. 30, line 51, change "fonn" to --form--.
Col. 31, line 6, change "funetional" to --functional--.
Col. 31, line 15, change "$R_{[OCOCH_2}COCH_2R_{21}]a$" to --$R_{20}[OCOCH_2COCH_2R_{21}]_a$--.
Col. 31, line 19, change "fianetional" to --functional--.
Col. 31, line 24, change "frmne-" to --fune- --.
Col. 31, line 27, change "siloxarie" to --siloxane--.
Col. 31, line 33, change "arnines" to --amines-- and change "aldirnines" to --aldimines--.
Col, 31, line 41, change "funetional" to --functional-- and delete the word "has".
Col. 31, line 47, change "funetional" to --functional--.
Col. 31, line 56, change "funetional" to --functional--.
Col. 31, line 57, change "funetional" to --functional--.
Col. 32, line 7, change "flinctional" to --functional--.
Col. 32, line 8, change "fhnctional" to --functional--.
Col. 32, line 11, change "amjnosilanes" to --aminosilanes--.
Col. 32, line 33, change "funetional" to --functional--.
Col. 32, line 34, change "frilly" to --fully--.
Col. 32, line 45, change "acetoacctate-fhnctional" to --acetoacetate-functional--.
Col. 32, line 65, change "thereot" to --thereof--.
Col. 33, line 17, change "aininosilanes" to --aminosilanes--.
Col. 34, line 4, change the closing parenthesis ")" to a comma --,-- and change "tin;;" to --"n"--.
Col. 34, line 25, change "fiinctional" to --functional--.

Signed and Sealed this

Twentieth Day of January, 2009

JON W. DUDAS
*Director of the United States Patent and Trademark Office*